J. M. MITTLEMAN.
SLED RUNNER ATTACHMENT FOR VEHICLE WHEELS.
APPLICATION FILED JAN. 24, 1910.
965,313.
Patented July 26, 1910.
Fig. 1.
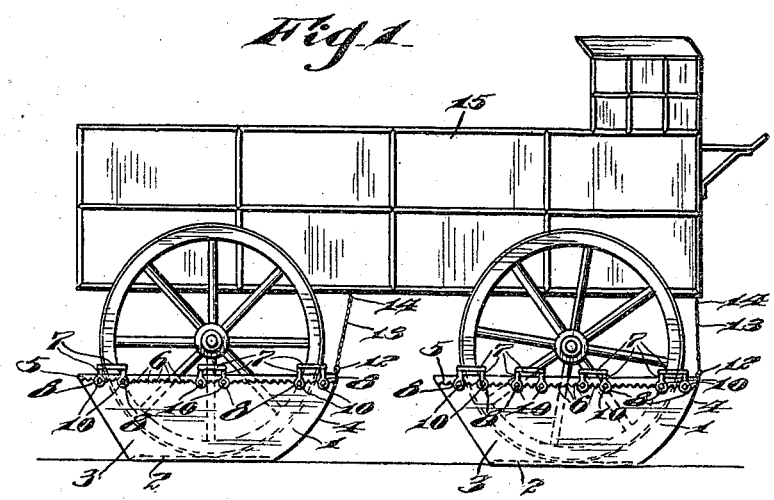
Fig. 2.
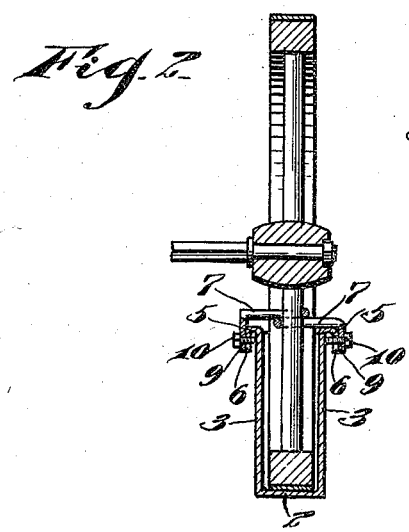
Fig. 3.
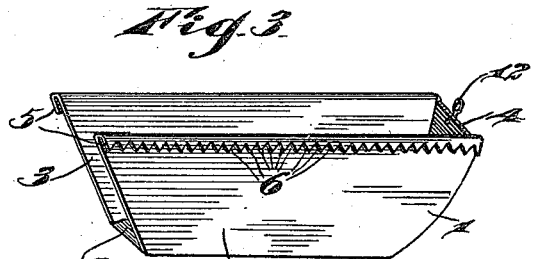
Fig. 5.
Fig. 4.
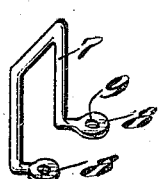
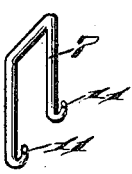
Witnesses
Theo. Rosemann
R. H. Kenkel
Inventor
Jacob M. Mittleman,
By Joshua R. H. Potts
Attorney

UNITED STATES PATENT OFFICE.

JACOB M. MITTLEMAN, OF PHILADELPHIA, PENNSYLVANIA.

SLED-RUNNER ATTACHMENT FOR VEHICLE-WHEELS.

965,313.  Specification of Letters Patent.  Patented July 26, 1910.

Application filed January 24, 1910. Serial No. 539,672.

*To all whom it may concern:*

Be it known that I, JACOB M. MITTLEMAN, a citizen of the United States, residing at Philadelphia, in the county of Philadelphia and State of Pennsylvania, have invented certain new and useful Improvements in Sled-Runner Attachments for Vehicle-Wheels, of which the following is a specification.

My invention relates to improvements in sled runner attachments for wheels, the object of the invention being to provide a cheap and inexpensive runner, which may be quickly attached to the wheels of any vehicle to convert the wheeled vehicle into a sled.

A further object is to provide improvements of this character, in which the wheels may be run in and secured, regardless of the position or angles of the spokes in the device.

With these and other objects in view, the invention consists in certain novel features of construction, and combinations and arrangements of parts as will be more fully hereinafter described and pointed out in the claims.

In the accompanying drawings, Figure 1, is a view in side elevation illustrating my improvements. Fig. 2 is an enlarged view in vertical section through one of the wheels. Fig. 3, is a detail perspective view of one of the runners. Fig. 4, is a detail perspective view of one of the attaching devices, and Fig. 5, is a view of a modified form of attaching device.

1 represents my improved runner, which is made, preferably, of sheet metal, having a bottom 2, parallel sides 3, 3, and front curved end 4. The rear end of the runner is left open as shown, so as to permit the runner to be placed upon the ground in advance of and in line with the wheel, and then run the wheel into the open end of the runner and secure the same, as will hereinafter appear.

The upper edges of the sides 3, 3, are bent over and downward as shown at 5, and are provided with a longitudinal series of notches 6.

For securing the wheels against rotary movement in the runners, I provide securing devices 7 as shown in Fig. 4. These securing devices comprise heavy wires, which are bent into general U form, so as to straddle a spoke or felly of the wheel, and have downwardly bent flattened ends 8, which ends are provided with screw threaded openings 9 in which screws 10 are mounted. When these securing devices are in position around a spoke or felly with the ends 8 projecting downward outside of the sides 3, 3, the screws 10 are screwed inward to engage in notches 6, and securely clamp the securing devices around the spoke or felly and to the runner. I preferably employ two of these securing devices at the rear spoke or felly as shown most clearly in Fig. 2, with the securing devices projecting in opposite directions and secured to opposite sides of the runner.

A modified form of securing device is shown in Fig. 5, in which the screws 10 are dispensed with, and the ends of the wires bent into hooked form as shown at 11, and are adapted to be sprung into the notches 6 to secure the spokes and felly.

While in most cases there would be no likelihood of the wheels turning with the runners thereon, to absolutely prevent any possibility of such turning movement, I have provided eyes 12 on the front ends 4, and connect these eyes by flexible connecting devices 13 with suitable hooks or eyes 14 on the body of the vehicle 15.

It will be noted with my improvements the runners can be placed in position in front of the wheels, the vehicle can then be drawn forward so as to run the wheels into the runners, and regardless of the position the spokes may assume with relation to the runners, the securing devices may be readily positioned and securely clamp the runners on the wheels.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. A sled runner attachment for wheels, comprising a sheet metal body bent forming a bottom and sides, and the upper edges of the sides bent over and downward, and provided with a plurality of notches, securing devices of general U-shape adapted to be positioned around the spokes and felly of a wheel, depending lugs on said securing devices, and screws in said lugs adapted to be moved in any of the notches.

2. The combination with a wheeled vehicle, of sled runner attachments for each wheel, having open rear ends into which the wheels are adapted to be run, enlargements on the upper edges of the side members of said attachments having a longitudinal series of notches in their lower faces, securing devices adapted to be positioned around the spokes and fellies of the wheels, and secured to said enlargements, and flexible connecting devices connecting the front ends of said attachments with the body of the vehicle.

In testimony whereof I have signed my name to this specification in the presence of two subscribing witnesses.

JACOB M. MITTLEMAN.

Witnesses:
R. H. KRENKEL,
CHAS. E. POTTS.